United States Patent [19]

Taylor, Jr.

[11] Patent Number: 4,951,059
[45] Date of Patent: Aug. 21, 1990

[54] DUAL STACKED BEAM RADAR

[75] Inventor: John W. Taylor, Jr., Baltimore, Md.

[73] Assignee: Westinghouse Electric Corp., Pittsburgh, Pa.

[21] Appl. No.: 266,193

[22] Filed: Nov. 2, 1988

[51] Int. Cl.⁵ .......................................... G01S 13/48
[52] U.S. Cl. .................................. 342/155; 342/147
[58] Field of Search ............... 342/147, 155, 158, 157

[56] References Cited

U.S. PATENT DOCUMENTS

| 3,900,874 | 8/1975 | Larkin et al. | 342/91 |
| 4,122,448 | 10/1978 | Martin | 342/174 |
| 4,137,532 | 1/1979 | Taylor, Jr. et al. | 342/93 |
| 4,153,899 | 5/1979 | Taylor, Jr. | 342/162 |
| 4,309,703 | 1/1982 | Blahut | 342/201 |
| 4,353,073 | 10/1982 | Brunner et al. | 343/779 |
| 4,538,150 | 8/1985 | Bone, Jr. | 342/174 |
| 4,578,676 | 3/1986 | Harrison, Jr. | 342/89 |
| 4,618,864 | 10/1986 | Martin et al. | 342/162 |
| 4,649,389 | 3/1987 | Taylor, Jr. et al. | 342/123 |
| 4,713,664 | 12/1987 | Taylor, Jr. | 342/91 |

Primary Examiner—Thomas H. Tarcza
Assistant Examiner—John B. Sotomayor

[57] ABSTRACT

A dual stacked beam radar in which, after listening to low stack beams, and waiting for their echoes to return, a transmitter signal is transmitted on high, the high stack beams being listened to during the longer dead times during variable interpulse periods of the low stack beams.

14 Claims, 2 Drawing Sheets

DUAL STACKED BEAM RADAR

/CROSS-REFERENCED TO RELATED APPLICATION

This application is cross-referenced to application Ser. No. 266,429, filed 11/2/88.

BACKGROUND OF THE INVENTION

(1) Field of the Invention

The present invention is directed to a dual stacked beam radar having combined interpulse period sequencing and an antenna having two groups of multiple beams stacked in elevation. Thus, half the usual number of receivers and signal processors are employed and a smoother velocity response than prior art devices is obtained by interleaving the interpulse periods.

(2) Description of Related Art

Two types of stacked beam radars have been employed in the past. The most common type is a simultaneous stacked beam configuration which employs N receivers (N being an integer) for listening simultaneously to N beams. The transmit pattern is shaped to obtain the desired power at each elevation direction. Receivers listen to echoes from each transmission in an individual receive beam. Because long range reception demands maximum power at low elevations, surface clutter is strongly illuminated and the receive beam sidelobes rarely provide adequate suppression of surface clutter interference. Therefore, each beam must include Doppler filtering to suppress the surface clutter interference.

Doppler filters add to the cost of each receiver and also introduce a sensitivity loss of several decibels (dB) averaged over all target radial velocities. At dim speeds (the radial speed at which there occurs a significant loss of sensitivity with respect to the average of all radial velocities), the loss can be many dB. Both factors require extra power to be transmitted at high elevation angles to compensate for the loss. The simultaneous stacked beam radar requires maximum transmitter cost as well as maximum receiver cost.

The second type of stacked beam radar is a sequential stacked beam configuration. This employs an array antenna which steers its beams in elevation by controlling either frequency or phase shifters, or both. In radar of this type, all beams have virtually the same bandwidth. Narrow beams are required at low elevations for long range detection and height accuracy. This results in a larger number of beams being required in order for the system to operate. To avoid a corresponding increase in the number of receivers, the elevation coverage is divided into multiple zones and is inspected sequentially. More pulses are transmitted in the lower beams where clutter interference is most severe and where power requirements are a maximum. Clutter in the higher beams is dictated by two-way sidelobes or frequency discrimination so that the high elevation beams use fewer pulses and do not require Doppler filtering. The absence of loss associated with Doppler filtering in the higher beams is an advantage of this configuration, but is achieved by stealing valuable dwell time (the time for the antenna to scan in the azimuth over a 6 dB two-way beamwidth) from the low elevation beams. Fewer interpulse periods are available to smooth the velocity response of the Doppler filters required for these beams.

The interpulse period is the time between transmitted pulses. If a fixed interpulse period is maintained with Doppler filtering, there are complete blind speeds at Doppler frequencies corresponding to integer multiples of the pulse repetition frequency (i.e., the inverse of the interpulse period). It is customary, therefore, to vary the interpulse period during the time the beam is on the target to fill in the blind speeds.

A smooth velocity response requires the use of a large number of different interpulse periods during each dwell time, the maximum interpulse period approaching twice the minimum interpulse period.

The present invention combines both techniques and overcomes the problems associated therewith.

SUMMARY OF THE INVENTION

It is an object of the present invention to provide a stacked beam radar which has reduced cost.

Another object of the present invention is to provide a stacked beam radar having fewer receivers than prior art simultaneous stacked beam radars and in which a smoother velocity response is obtained over that of prior sequential stacked beam radars.

It is a further object of the present invention to provide a stacked beam radar in which power requirements are reduced.

The above objects of the present invention are obtained by providing a dual stacked beam radar which divides a space into two areas. An antenna is provided as are transmitter and receiver means. The transmitter means transmits sequentially over one of two transmit beams having different elevation patterns and the echoes are received by a plurality of receive beams in a vertical stack including high stack beams and low stack beams. A switching means of switches between the two transmit beams and the two stacks of receive beams. The elevation beam-width of the individual receive beams may broaden as the elevation angle increases. The elevation angle can be measured by determining the beam having the strongest echo and comparing the echo amplitudes received in adjacent beams. A three-dimensional (3D) radar can be employed for reporting target position in range, azimuth, and height. The stack beams employ variable interpulse period sequencing to illuminate either the low stack or the high stack sequentially, so that only a small amount of energy illuminates ground clutter when illuminating the high stack.

In addition, a radar detection method is employed which includes transmitting and receiving high stack beams and low stack beams, the low stack beams including variable interpulse period sequences, and listening to echoes in the high stack beams during the longer interpulse periods of the variable interpulse period sequences of the low stack beams. These interpulse periods provide dead time in the low stack beams during which time the high stack is illuminated and echoes are received. The dead time required is determined by a minimum elevation angle of the high stack beams. In addition, clutter is suppressed without Doppler filtering in the high stack beams by employing high stack beams having adequate two-way sidelobes. Further, a low stack variable interpulse period sequencing with a maximum-to-minimum ratio approaching 2 provides both the desired smooth velocity response when Doppler filters are used to suppress clutter interference and the necessary dead time for high stack transmission and reception.

These objects, together with other objects and advantages which will be subsequently apparent, reside in the details of construction and operation as more fully hereinafter described and claimed, reference being had to the accompanying drawings, forming a part hereof, wherein like reference numerals refer to like parts throughout.

DESCRIPTION OF THE PREFERRED EMBODIMENT

Figure 1:
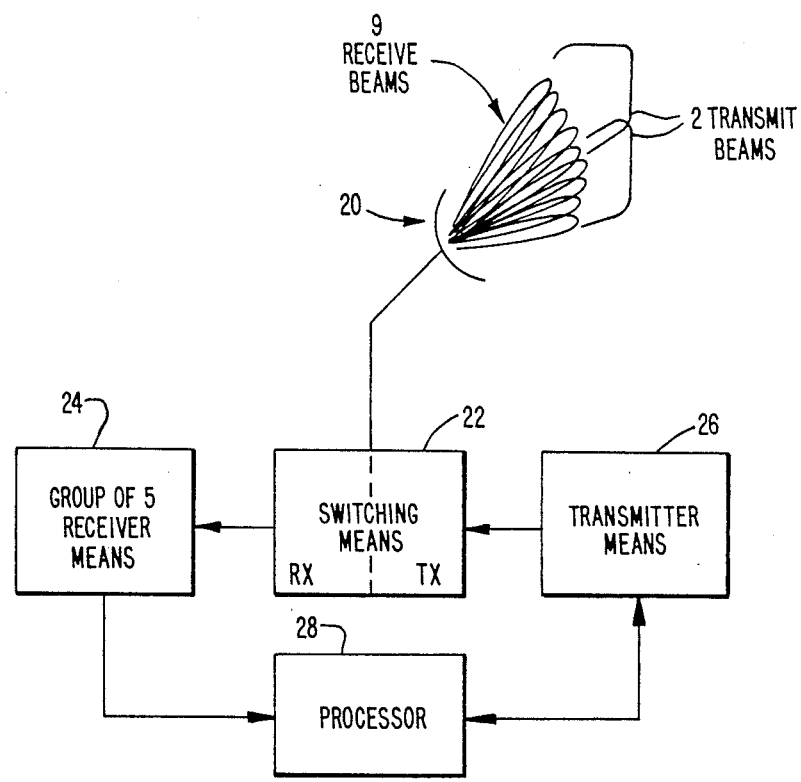
FIG. 1 is a block diagram of one version of a dual stacked beam radar according to the present invention.

The dual stacked beam radar of the present invention divides space into two areas; low stack beams and high stack beams, and illuminates either the low stack beams or the high stack beams, but not both simultaneously. This provides the advantage that less energy is used to illuminate the ground clutter echo when illuminating the high stacks. Therefore, Doppler filtering is not necessary for the high stack beams so that less hardware is employed. In addition, there is less transfer of power required in the high stack beams because it is not necessary to overcome losses due to Doppler filtering.

A radar architecture for search radars which cover 360° in the azimuth and typically 20° or more in elevation will be described hereinafter. The present invention is not, however, restricted to this description.

The dual stacked beam radar of the present invention is applicable to 3D radars and to long range 2D radars with solid state transmitters where it is impractical to generate sufficient power to detect aircraft using a single transmit beam and one or two receive beams, which is typical of older radars having vacuum tube transmitters. A large receive aperture minimizes the power required if utilized to form narrow beams in both azimuth and elevation. This sub-divides the coverage volume which must be scanned in a specified period, typically within 10 to 12 seconds.

A multiplicity of simultaneous receivers must be employed in this class of radar in order to obtain sufficient dwell time in each beam position and to enable detection of aircraft over surface clutter such as land or sea back scatter. A dwell time of 3 to 5 interpulse periods may be sufficient to suppress most clutter interference below noise level, but undesired suppression of aircraft echoes does occur at certain range rates called blind speeds, where suppression is nearly total, or dim speeds where sensitivity loss is more modest. A much longer dwell time is then required to fill in the blind speeds by using a sequence of interpulse periods producing dim speeds at different locations.

A configuration of multiple receive beams in a vertical stack is generally considered an optimum configuration. It is this class of stacked beam radar which the present invention addresses. The elevation angle of a target may be measured by noting the beam having the strongest echo and comparing the echo amplitudes simultaneously received in adjacent beams. This elevation monopulse process (the detection of the elevation angle of a target from simultaneous reception of the echo on multiple beams, determining which beam has the strongest echo, and then comparing the echoes to determine the location of the target) is employed in 3D radar which report target position in range, azimuth, and height.

To minimize the number of receivers, the elevation bandwidths of the stack of receive beams may broaden as the elevation angle increases. Maximum aircraft altitude forces aircraft at high elevation angles to be at short range where less two-way (transmit-receive) gain is required for detection and where greater angular error is tolerable for a given height accuracy. A number of beams larger than the optimum number of beams increases the cost of the receivers and signal processors used in the system more than a reduction in transmitter cost and provides better height accuracy than required. In two-dimensional radar, the optimum is clearly determinable; whereas in three-dimensional radar, the combination of the three factors of range, azimuth and height is more complex.

FIG. 1 is a radar system according to the present invention including an antenna 20 which provides nine receive elevation beams and two transmit beams (covering the lower and upper five receive beam elevations, respectively), switching means 22 connected to the antenna 20 and to a receivers means 24 and a transmitter means 26 for switching between the low stack beams and high stack beams so as to exploit the dead time available in variable interpulse period sequences in the low stack beams in order to cover the high stack region. The receiver means 24 can include a group of five receivers. The switching means 22 has a transmit side TX and a receive side RX. The present invention is based on the idea that the reduction in loss of sensitivity at dim speeds, which is an important characteristic of the beams which encounter clutter, demands that the lower stack beams employ variable interpulse period sequences having a maximum-to-minimum ratio approaching 2. If the shortest interpulse period corresponds to the time for echoes received from a maximum instrumented range, the longer interpulse periods include substantial dead time which can be utilized to transmit and receive echoes from the higher stack beams. If the transmission and reception of the high stack beams have low sidelobes with respect to surface clutter and thus, receive little energy into the surface clutter, then Doppler filtering is not necessary in the receivers 24. Power requirements are therefore at a minimum and two or three pulses per azimuth beam (6 dB two-way) are adequate if reasonably spaced.

A processor 28 can be connected between the receiver means 24 and the transmitter means 26 in a 3D system. The processor 28 measures elevation angle by determining the beam having the strongest echo and then comparing echo amplitudes in adjacent beams. A 2D system does not employ the processor 28.

The transmit portion of the switching means 22 can be any type of switch necessary to obtain the desired results including a high isolation switch to improve the characteristics of the device (see U.S. application Ser. No. 07/266,429 to Taylor, filed Nov. 2, 1988) or a high power switch. Employing a high power switch, however, can be costly. A high isolation switch is less costly than a high power switch and also results in improved characteristics of the radar.

The larger dead times available in the variable interpulse sequences are used efficiently to cover the high stack region and provide a major cost reduction for solid state radars - 2D as well as 3D. In addition, no useful time is stolen from the low stack beams, allowing the maximum number of interpulse periods to be used to smooth the velocity response and to minimize the energy per pulse required to detect long range targets.

It is known in the art that an exponential variable interpulse period group provides the smoothest velocity response where the interpulse periods are defined by:

$$T_n/T_o = 2^{n/N}; \text{ where } 0 \leq n \leq N-1$$

where $T_n$ is the interpulse period, and n indicates the order ($T_{min} = T_o$), not necessarily the position in the variable interpulse period sequence. Increasing N, which is the number of interpulse periods, provides smoother velocity response. It is therefore desirable to choose N to complete the variable interpulse period sequence in 70% to 100% of the dwell time (the time for the antenna 20 to scan in the azimuth by the 6 dB two-way beamwidth). Table 1 shows that the longer interpulse periods of the variable interpulse period sequences provide ample dead time in the low stack beams to listen to echoes in the high stack beams. The high stack beams reach maximum aircraft altitude long before the maximum instrumented range. The choice of the minimum elevation angle of the high stack coverage regions dictates how much dead time is long enough.

TABLE 1

| Preferred Exponential Interpulse Period (IP) Choices | | | | |
| --- | --- | --- | --- | --- |
| Number of Interpulse Periods | 7 | 8 | 9 | 10 |
| Exponential Increment in IP (%) | 10.37 | 9.02 | 7.89 | 7.15 |
| Longest IP/Min IP ($T_{N-1}/T_o$) | 1.81 | 1.83 | 1.85 | 1.86 |
| 2nd Longest IP/Min IP ($T_{N-2}/T_o$) | 1.63 | 1.68 | 1.71 | 1.74 |
| 3rd Longest IP/Min ($T_{N-3}/T_o$) | 1.48 | 1.54 | 1.58 | 1.62 |
| 4th Longest IP/Min ($T_{N-4}/T_o$) | — | — | 1.47 | 1.51 |

For example, a radar instrumented to detect aircraft below 100 kilofeet (kft) and a 30° elevation angle at ranges from 5 to 250 nautical miles (nmi), requires a solid state transmitter having a long transmitted pulse. Therefore, assuming that $T_o$ corresponds to 267 nmi (3.3 ms), an azimuth beam width of 1.4° in a scan period of 12 seconds provides slightly over 10 hits per dwell in the low stack beams. Therefore, the variable interpulse period sequences in Table 1 are all valid candidates. Table 2 (shown below) compares pairs of variable interpulse period (IP) choices having virtually the same high stack capability for determining which pair of variable interpulse periods provides the greater number of hits per beam width in the high stack beams. The results are similar to Table 1. However, there is a small advantage to using a larger number of interpulse periods since the greater the number of interpulse periods, the smoother the velocity response. On the other hand, more than three high stack beam hits per beam width are rarely necessary from the viewpoint of azimuth accuracy, azimuth resolution, or detection energy.

TABLE 2

| Comparison of VIP Candidates | | | | |
| --- | --- | --- | --- | --- |
| High/Low Stack Pulse Ratio | 2/7 | 3/10 | 3/7 | 4/9 |
| High/Low Stack Min. Time Ratio | 0.63 | 0.62 | 0.48 | 0.47 |
| High Stack Hits/Ten Low Stack Hits | 2.8 | 3 | 4.2 | 4.4 |

A nine variable interpulse period sequence is advantageous in this case because the order can be arranged to provide long interpulse periods every third interpulse period, making the spacing of the high stack beam pulses more uniform. If a nine variable interpulse period sequence is employed and 17 nmi is allocated to pretransmission and transmission operations in both stacks, the instrumented range for a 3/9 pulse ratio is:

$$0.58(250+17)-17=137.8 \text{ nmi.}$$

This range must be sufficient for the worst siting, i.e., the highest radar site having the antenna beams tilted down.

Figure 2:
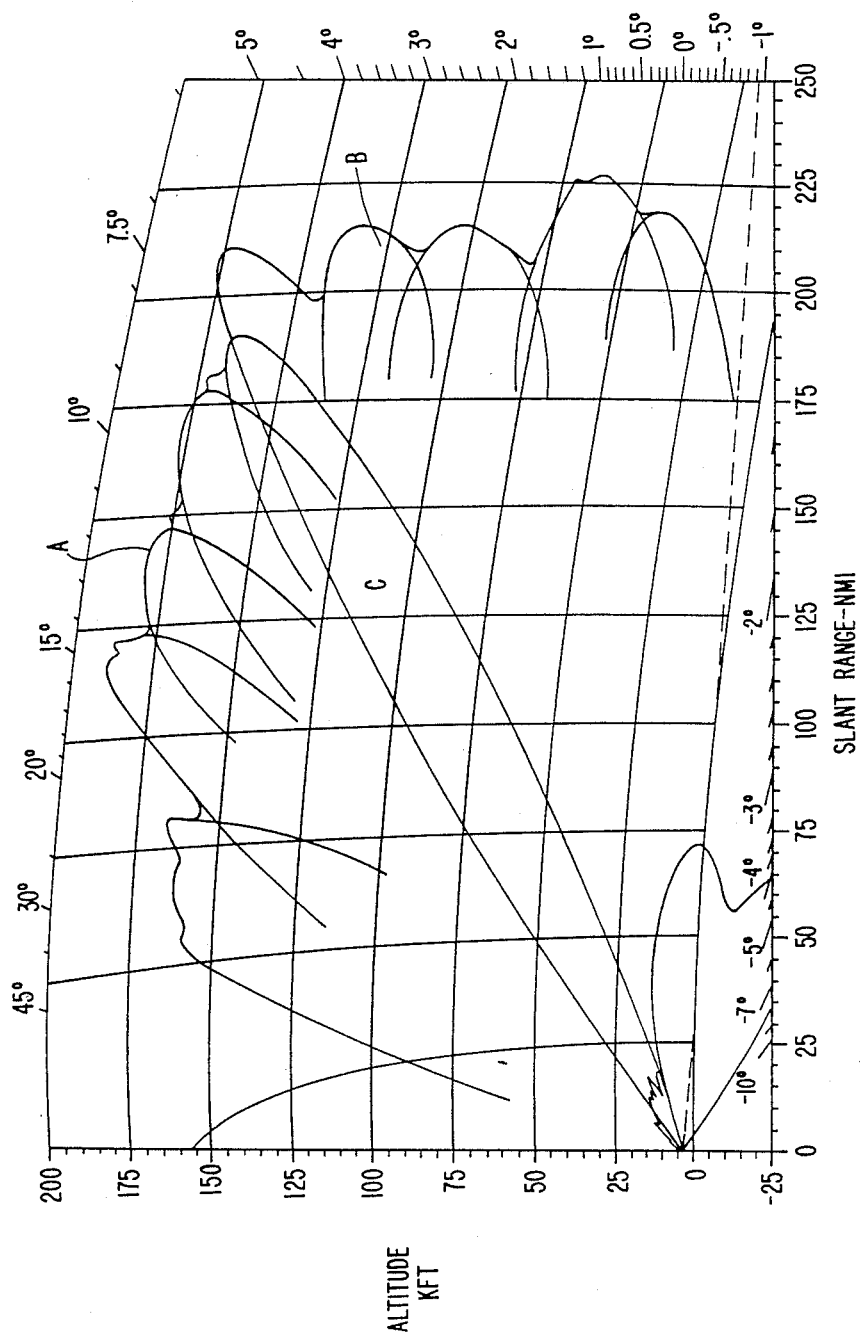
FIG. 2 is a graph of altitude versus range of low and high beam sets employing five beams, according to the present invention.

FIG. 2 is a graph of the coverage of radar having five beams in each stack from a site at 3500 feet above mean sea level. Curve A is the high stack beams and curve B shows the low stack beams. The area C shows the overlap of the high stack and low stack beams. At approximately 200 nmi there is not much clutter as shown in FIG. 2.

In the device of the present invention, receiver cost is minimized if there are the same number of beams in the high and low stacks. However, this is not a necessary condition. The high stack beams have two-way sidelobes which suppress the specified clutter, such as mountain clutter which often extends to several degrees elevation (3° is specified for the radar in the graph of FIG. 2), without employing Doppler filtering. This is because if the amount of energy which leaks through the low stack beams is attenuated and if the sidelobe of the high stack beams have low energy (a two-way sidelobe) then sufficient attenuation is provided and no further Doppler filtering is necessary.

For a two-dimensional radar, coverage of high and low stack beams must be contiguous but need to overlap. For a three-dimensional radar, height interpolation demands that one beam be common to both stacks, and both transmissions must illuminate targets in this overlap region. The radar in FIG. 1 and in the graph of FIG. 2 is such a 3D radar and uses five receivers for nine beams.

In contrast with prior sequential stacked beam radars, the present invention does not steal useful time from the low stack beams because, for example, variable interpulse periods are used such that when the low beam is transmitted and sufficient time has elapsed to receive an echo from the maximum instrumented range, a high beam is transmitted and listened to, while waiting for the time to transmit the next pulse in the low beam. Therefore, the maximum number of interpulse periods is used to smooth the velocity response and the energy per pulse required to detect long range targets is minimized. Both these factors reduce the cost of the transmitter if detection over clutter at a high percentage of Doppler is required.

In addition, in contrast with prior simultaneous stacked beam radars, the present invention provides higher transmit gain in the low beams, typically halving the energy required in each pulse. Although the average power of the transmitter is not reduced to the same degree, the cost of the system is reflected in the energy per pulse rather than the average power. Average power is reduced by the fact that only a fraction of the energy must be directed to the high stack region of beams because Doppler filtering is not required, compared to a simultaneous stacked beam radar which has losses associated with Doppler filtering of echoes in the high stack beams.

The dual stacked beam radar of the present invention is a combination of optimum variable interpulse sequences in low stack beams and an antenna which can switch transmit beams and receive beams to exploit the dead time available between the variable interpulse period sequences so as to cover the high stack region. This provides a major cost reduction for 2D as well as 3D radars.

The foregoing is considered as illustrative only of the principles of the invention. Further, since numerous modifications and changes will readily occur to those skilled in the art, it is not desired to limit the invention to the exact construction and application shown and described, and accordingly, all suitable modifications and equivalents may be resorted to, falling within the scope of the invention and the appended claims and their equivalents.

What is claimed is:

1. A dual stacked beam radar, comprising:
   an antenna;
   transmitter means for transmitting sequentially on two transmit beams having different elevation patterns;
   receiver means having a plurality of receivers for simultaneously listening to a plurality of receive beams in a vertical stack including high stack and low stack beams, said low stack beams having variable interpulse period sequences, dead time is the interpulse period utilized to transmit and receive echoes from the high stack beams; and
   switching means, connected to said antenna, said transmitter means and said receiver means, for switching between the two transmit beams and the two stacks of receive beams.

2. A dual stacked beam radar according to claim 1, wherein said receiver means includes five receivers.

3. A dual stacked beam radar according to claim 2, wherein the plurality of receive beams includes nine receive beams.

4. A dual stacked beam radar according to claim 1, wherein elevation beamwidth of the stack of receive beams broadens as the elevation angle increases.

5. A dual stacked beam radar according to claim 1, wherein the variable interpulse period sequences of the low stack beams have a maximum-to-minimum ratio approaching 2.

6. A dual stacked beam radar according to claim 1, wherein the radar is a three-dimensional radar for reporting target position in range, azimuth, and height.

7. A dual stacked beam radar according to claim 1, wherein the radar is a two-dimensional radar.

8. A dual stacked beam radar, comprising:
   an antenna;
   transmitter means for transmitting sequentially on two transmit beams having different elevation patterns;
   receiver means having a plurality of receivers for listening to a plurality of receive beams in a vertical stack including high stack and low stack beams, an elevation bandwith of the stack of receive beams broadening as the elevation angle increases, the elevation angle measured by determining the beam having the strongest echo and comparing echo amplifiers received in adjacent beams, the low stack beams including variable interpulse period sequencing, dead time in the interpulse period utilized to transmit and receive echoes from the high stack beams, the low stack beams having a maximum-to-minimum ratio approaching two;
   switching means, connected to said antenna, said transmitter means, and said receiver means, for switching bewteen the two transmit beams and the two stacks of receive beams; and
   processing means, coupled to said receiver means and said transmitter means, for determining the elevation angle.

9. A dual stacked beam radar according to claim 8, wherein said receiver means includes five receivers, and wherein the plurality of receive beams includes nine beams.

10. A dual stacked beam radar detection method, comprising the steps of:
    (a) transmitting sequentially on two beams;
    (b) receiving high stack beams and low stack beams, the low stack beams having variable interpulse period sequences, the shortest interpulse period corresponding to a time for echoes to be received from a maximum instrumented range, the remaining interpulse periods having substantial dead time; and
    (c) utilizing the dead time to transmit and receive echoes from the high stack beams.

11. A method according to claim 10, wherein in said step (b) said variable interpulse period sequences having a maximum-to-minimum ratio approaching 2, and providing high stack listening time determined by a minimum elevation angle of the high stack beams and maximum altitude of coverage.

12. A method according to claim 11, further comprising the step of suppressing specified clutter without Doppler filtering by employing high stack beams having sufficiently low two-way sidelobes.

13. A method according to claim 10, wherein said step (b) further comprises providing the same number of beams in the high and low stacks.

14. A method according to claim 10, wherein said step (b) further comprises providing an unequal number of beams in the high stacks and low stacks.

* * * * *